…

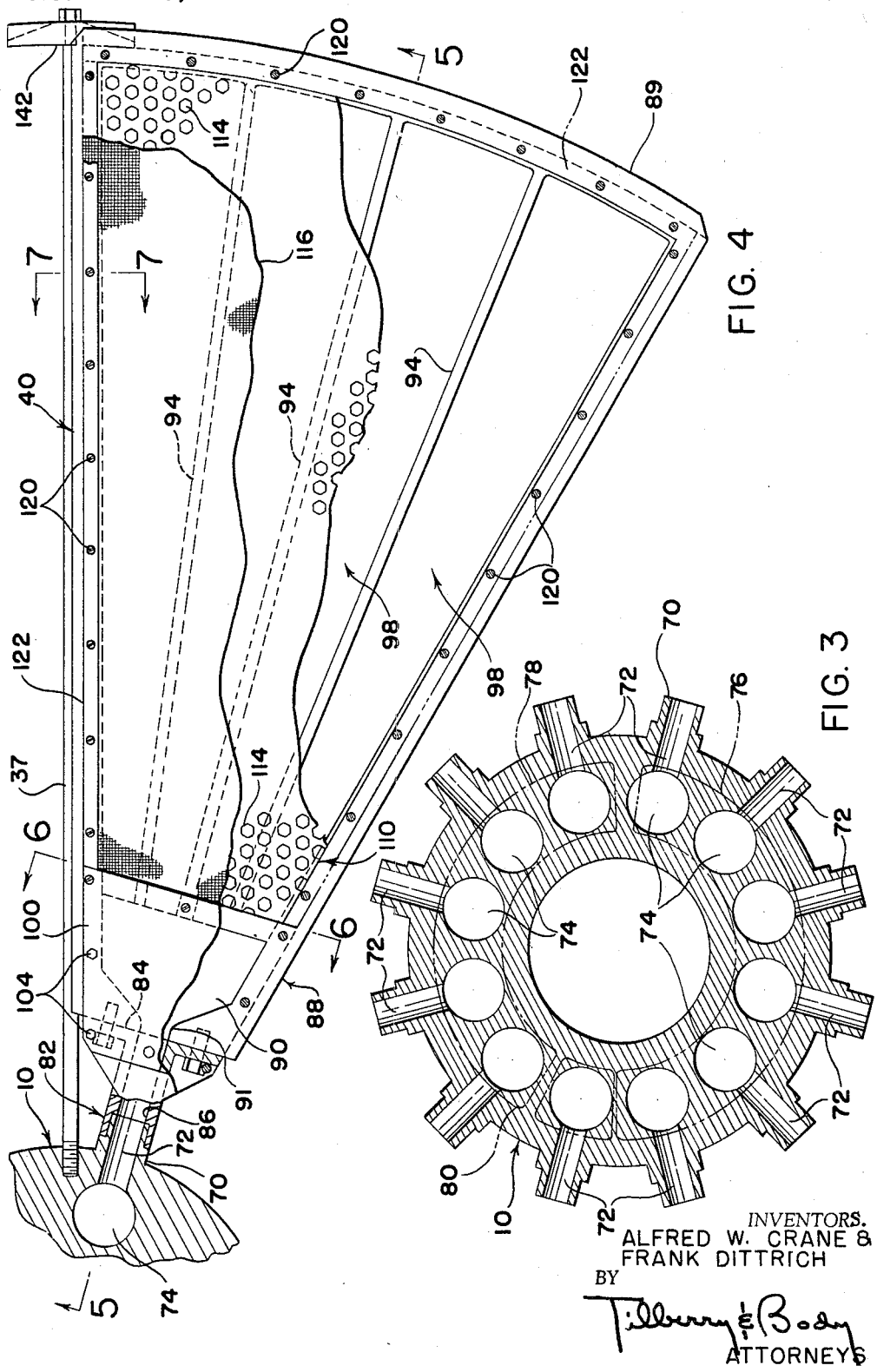

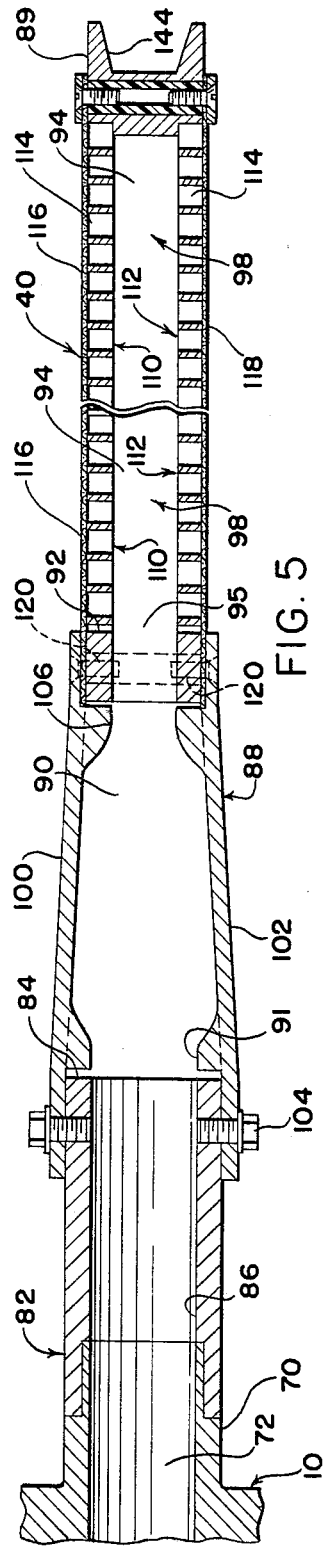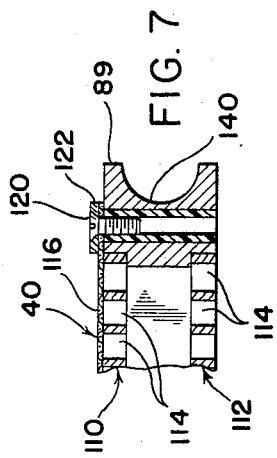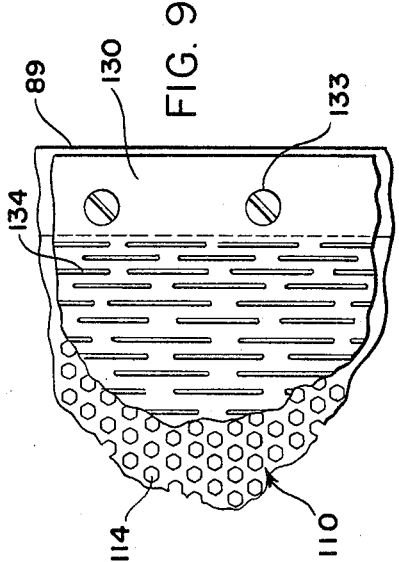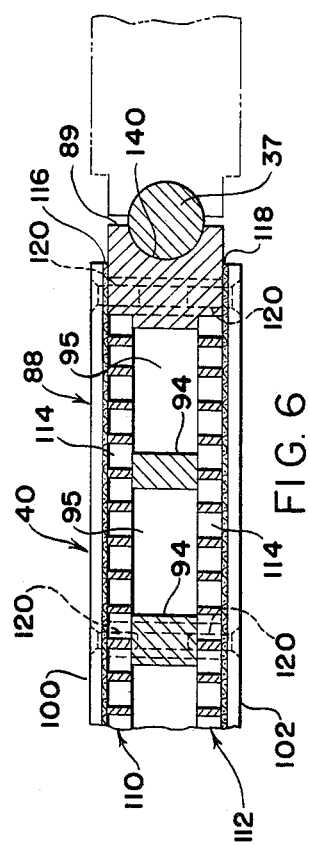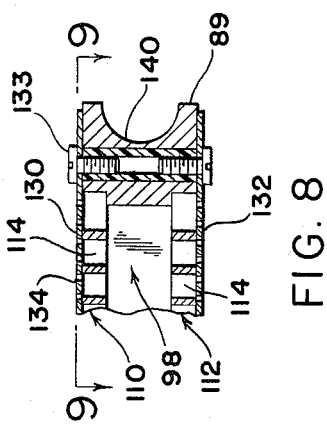

United States Patent Office 3,283,906
Patented Nov. 8, 1966

3,283,906
VACUUM FILTER
Alfred W. Crane, Parma, Ohio, and Frank Dittrich, Chagrin Falls, Ohio (both % The Cleveland Electric Illuminating Co., P.O. Box 5000, Cleveland, Ohio)
Filed Dec. 19, 1963, Ser. No. 331,691
1 Claim. (Cl. 210—232)

This invention pertains to the art of vacuum filters and more particularly to a vacuum filter having a segmented vacuum disk adapted to rotate through a slurry of particles suspended in a liquid carrier for separating the particles therefrom.

The present invention is particularly applicable to the art of separating small particles of coal from a coal slurry such as that transmitted by pipe lines from the coal mines to an electric generating plant and the invention will be described with particular reference thereto; however, it will be appreciated that the invention has much broader applications and may be used in a variety of installations wherein small suspended particles are to be separated from a liquid carrier.

In some locations coal is transported from the mines to the consumer by forming a slurry of water and small particles of coal and then pumping the slurry through a pipe line to the consumer. When the slurry reaches the consumer, the coal must be separated from the water before it can be used. A variety of apparatus may be used for separating the coal; however, the most common apparatus is a vacuum filter having a plurality of hollow coaxial disks adapted to rotate through the slurry. A vacuum source is connected to the interior of each disk and the outer surface of the disk is provided with a small mesh covering so that the small particles of coal suspended in the slurry are attracted to the outer surface of the disks. As the disks rotate out of the slurry, the interior vacuum draws the water from the particles to produce a mass of coal having a relatively low water content. This coal mass is then scraped from the suface of the vacuum disks and is dehydrated in an appropriate furnace to remove most of the moisture from the coal.

It has been common practice to build each of the rotating disks from a plurality of wooden sectors having a multiplicity of surface grooves which form vacuum passageways within the sectors. A suitable small mesh, surface screen was tacked over the surface grooves to provide a smooth outer surface on both sides of the sectors. The vacuum passageways formed by the surface grooves provided the drainage conduits for the water drawn from the coal particles attracted to the disks. These grooves had to be machined into a complex network to accommodate the proper flow of water and distribution of vacuum along the entire surface of the sector. For this reason, the groove network was quite complicated and substantially increased the cost of the sector. In addition, this complex network resulted in a substantial increase in the aerodynamic friction against which the vacuum within the disks had to operate.

Both sides of the sector were provided with a complex network of small grooves and the sector was wedge-shaped; therefore, a great number of grooves were funneled into a single or a very few grooves at the top, or innermost end, of the sector. The few grooves at the top of the sector could not accommodate the flow from the many grooves at the bottom of the sector; therefore, the efficiency of the sector was decreased. Also, the vacuum was introduced into the network of grooves near the top of the sector so that it was difficult to cause the vacuum to feed through the labyrinth of grooves to obtain a strong vacuum at all surface areas of the sector. Another disadvantage in the prior construction was that the wooden sectors would warp and deteriorate quite rapidly during operation, and the wood from which the sectors were constructed would absorb a substantial amount of water to greatly increase the weight of the sectors. This increased weight increased the power required to drive the vacuum filter.

The present invention is directed toward a novel sector used to construct a vacuum filter disk which corrects the above-mentioned difficulties and others and which requires less maintenance and has a higher filtering efficiency.

In accordance with the present invention, there is provided a disk type of vacuum filter having at least one segmented vacuum disk adapted to rotate through a slurry of water and small suspending particles and covered with a pervious material which disk comprises a substantially flat metallic body defining an inner plenum chamber opening toward at least one of the flat surfaces of the disk, the plenum chamber being covered with both a perforated plate having relatively large perforations leading from the inner plenum chamber and a fine mesh surface covering over the perforated plate.

In accordance with another aspect of the present invention, the novel disk as defined above is provided with a second plenum chamber in the metallic body and communicated with the first-mentioned inner plenum chamber and a removable cover for the second plenum chamber to allow inspection and cleaning of that chamber.

In accordance with a more limited aspect of the presnet invention, the vacuum disk is formed with a plurality of wedge-shaped sectors each having at least the first-mentioned plenum chamber and means for securing the sectors together to form the disk.

The primary object of the present invention is the provision of a vacuum filter of the type for separating particles from a slurry which filter is economical to manufacture and durable in operation.

A further object of the present invention is the provision of a vacuum filter of the type having a segmented disk adapted to rotate in a slurry for separating small particles from the slurry, which disk is formed of a material that does not absorb water from the slurry.

A further object of the present invention is the provision of a vacuum filter of the type having a segmented disk adapted to rotate in a slurry for separating small particles from the slurry, which disk does not warp or deteriorate appreciably during operation of the filter.

Another object of the present invention is the provision of a vacuum filter of the type having a segmented disk adapted to rotate in a slurry for separating small particles from the slurry, which disk has at least one central plenum chamber to direct a vacuum to the surface of the disk with a minimum of aerodynamic resistance.

Still another object of the present invention is the provision of a vacuum filter of the type having a segmented disk adapted to rotate in a slurry for separating small particles from the slurry, which disk is comprised of a body produced from a noncorrosive metal, such as aluminum.

A further object of the present invention is the provision of a vacuum filter of the type having a segmented disk adapted to rotate in a slurry for separating small particles from the slurry, which disk is comprised of a body produced from a light weight metal, such as aluminum.

Still a further object of the present invention is the provision of a vacuum filter of the type having a segmented disk adapted to rotate in a slurry for separating small particles from the slurry, which disk comprises a plurality of sectors, each sector having an inner plenum chamber, a perforated plate over the chambers so that the perforations of the plate lead from the chamber, and a fine mesh surface covering over the perforated plate.

Another object of the present invention is the provision of a vacuum filter of the type having a segmented disk adapted to rotate in a slurry for separating small particles from the slurry, which disk comprises a plurality of sectors, each sector having a plurality of axially extending inner plenum chambers that are connected near their innermost end to a base plenum chamber so that a maximum separation efficiency can be obtained.

These and other objects and advantages will become apparent from the following description used to illustrate a preferred embodiment of the invention as read in connection with the accompanying drawings in which:

FIGURE 3 is a cross-sectional view disclosing schematically the valving arrangement for the vacuum filter;

FIGURE 4 is a partial cross-sectional view of the preferred embodiment of the present invention;

FIGURE 5 is a cross-sectional view taken along line 5—5 of FIGURE 4;

FIGURE 6 is a partial cross-sectional view taken along line 6—6 of FIGURE 4;

FIGURE 7 is a partial cross-sectional view taken along line 7—7 of FIGURE 4;

FIGURE 8 is a partial cross-sectional view showing another modification of the structure disclosed in FIGURE 7;

FIGURE 9 is a partial view taken along line 9—9 of FIGURE 8; and

Figure 1:
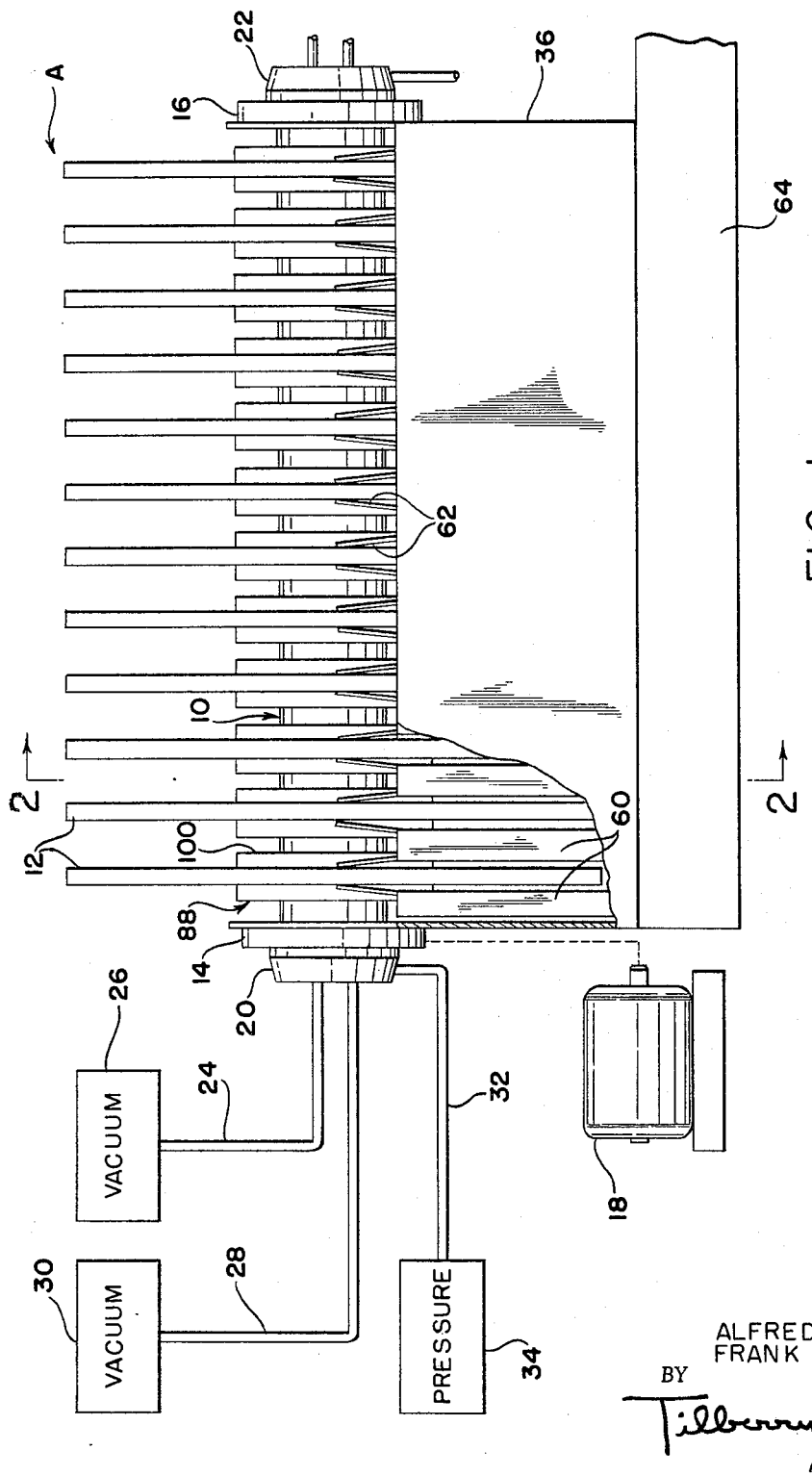
FIGURE 1 is a side elevational and somewhat schematic view of the vacuum filter using the present invention.

Referring now to the drawings wherein the showings are for the purpose of illustrating a preferred embodiment of the invention and not for limiting same, FIGURE 1 shows a disk type of vacuum filter A having a longitudinally extending rotatable shaft 10 on which are mounted a plurality of segmented disks 12 so that the disks are spaced axially one from the other. The present invention is particularly directed to the construction of the segments or sectors, used to build the vacuum disks 12; however, before the intended scope and application of the present invention can be properly appreciated, it is necessary to discuss briefly the environment to which the invention is directed. The rotatable shaft 10 terminates in spaced end housings 14, 16 which serve as journals for the shaft 10 and support a drive mechanism 18 which may be located at either end of the filter. Each of the end housings are provided with valving hubs 20, 22 respectively which selectively communicate the various segments, or sectors, of the disks 12 with line 24 connected to vacuum source 26, line 28 connected to vacuum source 30, or line 32 connected to pressurized air source 34 to control the separating operation of the disks. Basically, the same arrangement of lines leading to hub 20 is provided for hub 22.

Figure 2:
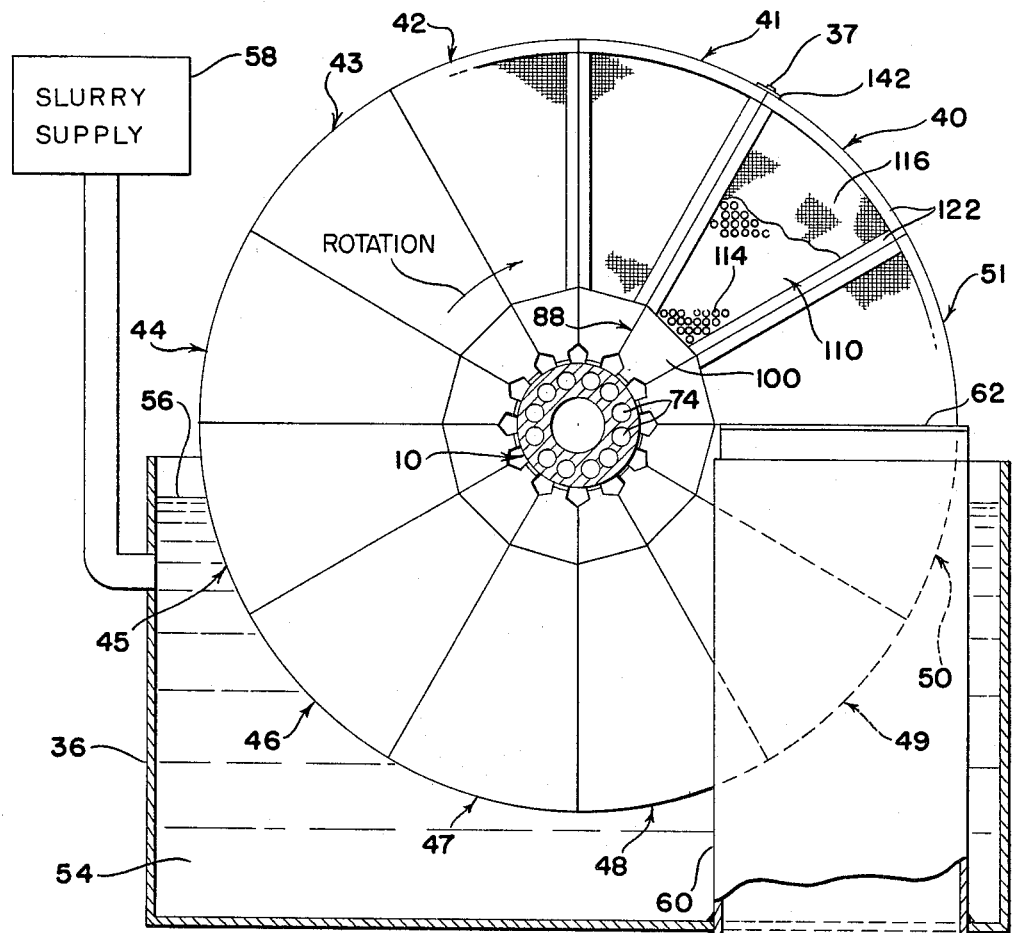
FIGURE 2 is a cross-sectional view taken along line 2—2 of FIGURE 1.

Each of the segmented disks 12 extends radially outwardly from shaft 10 into a slurry tank 36, best shown in FIGURE 2. In this figure it is noted that the disks 12 are formed of a plurality of generally flat, wedge-shaped segments, or sectors, 40–51 which are affixed to shaft 10 by the rods 37 as shown in FIGURE 4. The number of sectors may be varied without changing the operation of the filter. The means for attaching the sectors to the shaft and a detailed description of a novel sector construction will be hereinafter discussed. Tank 36 is filled with a slurry 54 comprising basically small suspended particles of coal in a liquid, such as water, and, as is shown, the slurry has an upper level 56 which is spaced only slightly from the lower surface of shaft 10. To maintain level 56 at a proper distance from shaft 10, additional slurry is introduced into the tank 36 by a schematically disclosed slurry supply 58. In practice, coal is pulverized at the coal mines where it is mixed with water to form a slurry which slurry is forced through an appropriate pipe line to the consumer where it is fed into the slurry tank 36.

Each of the disks is provided with a discharge chute 60 disclosed for illustrative purposes as a sheet metal member extending through the bottom of the slurry tank 36 and upwardly to a position above level 56. A chute 60 extends on either side of each disk 12 so that coal particles removed from the surfaces of the disk may be appropriately discharged. To assist in removing the particles from the surfaces of the rotating vacuum disk 12, means such as a scraper 62 is provided adjacent both surfaces of the disk 12 and above the discharge chute 60. The discharge chute terminates at a discharge conveyor 64, schematically represented as a dotted line, which directs the particles from the discharge chute 60 to a gas drying furnace 66. Various types of drying furnaces may be used without departing from the intended scope of the present invention.

In FIGURE 3, a simplified and in some respects schematic representation of the valving arrangement for the vacuum filter A is disclosed. Since this valving structure and the aforementioned filter structure do not form a part of the invention, they are disclosed only for better appreciation of the invention by understanding the environment for which the invention is adapted. Basically, bosses 70 are spaced about the outer periphery of shaft 10 and form the mounting support for the segments 40–51. The bosses 70 are communicated by lines 72 with apertures or passageways 74. The various valve openings are disclosed in phantom lines and it is appreciated that these are formed in a plate adjacent to the end of shaft 10 and more appropriately in valving hubs 20, 22. Valve opening 76 is connected to vacuum line 24; valve opening 78 is connected to vacuum line 28; and valve opening 80 is connected to pressurized air line 32. As the shaft rotates, the apertures or passageways 74 are communicated with the source determined by the valve opening adjacent the passageways.

Referring now to FIGURE 4 there is disclosed a preferred embodiment of the present invention and, more specifically, a sector for the vacuum disks 12 constructed in accordance with the present invention. Since the separate sectors of the disks are identical, a detailed description of the sector 40 will apply equally to the other sectors. The sector is provided with a radially inward hub 82 having a substantially flat mounting surface 84 and a radially extending stepped aperture 86, which aperture is substantially perpendicular to the mounting surface 84. The stepped aperture 86 of hub 82 fits over boss 70 to secure the sector 40 in appropriate spaced relationship on shaft 10. Hub 82 is affixed onto the radially innermost end of a generally wedge-shaped, and substantially flat, metal body 88 having an integral outer peripheral frame 89 extending outwardly from hub 82 and defining the wedge-shaped configuration of sector 40. Various metals may be used to manufacture the body 88; however, in order to provide appropriate corrosive resistance and light weight, it has been found that various aluminum alloys are the most desirable.

Near the radial innermost end of body 88, the sector 40 is provided with a base, or manifold, plenum chamber 90 having an aperture 91 extending radially inwardly and communicating with aperture 86 of hub 82. The radial outermost end of the base plenum chamber 90 is defined by a pair of transversely extending bridge-like members 92, 93 which are joined to radially extending spaced strips 94 to define a plurality of openings 95 leading from base, or manifold, plenum chamber 90 to a plurality of separate radially extending inner plenum chambers 98 defined by strips 94 and peripheral frame 89. Thus, in essence, body 88 is provided with a plurality of radially, extending inner plenum chambers 98 each of which is tapered toward, and communicated with, the radially inward base plenum chamber 90. As thus far described, the base plenum chamber 90 and inner plenum chambers 98 have relatively large openings facing toward each of the flat surfaces of the sector 40.

Referring now to FIGURE 5, the upper and lower openings of base plenum chamber 90 are closed by appropriate covers 100, 102 respectively. The covers are secured by appropriate means such as bolts 104 and they are provided with a contoured guide rim 106 to assure proper alignment of the cover over the plenum chamber openings. If coal particles collect in the base plenum chamber 90, as happens when the sector 40 develops a leak in its outer cover, the chamber may be easily cleaned without removing the sectors from the disk.

As shown in FIGURE 6, a pair of perforated plates 110, 112 are positioned on opposite sides of the plenum chambers 98 so that suitable perforations 114 lead from the radially extending plenum chambers 98. Various perforations may be provided in plates 110, 112; however, in the preferred embodiment, the perforations are in the form of a plurality of hexagonal openings and are substantially larger than the coal particles in the slurry. By providing an appropriate recess or shoulder along the inner portion of frame 89, the perforated plates may be pressed into the frame or otherwise affixed to the body 88.

A small mesh screen 116 is affixed to the outer surface of perforated plate 110 so that the screen substantially covers the complete outer surface of the sector 40. To affix the screen onto the sector, a plurality of bolts 120 are passed through strip 122 which secure the screen to the peripheral frame 89. Various means of affixing the screen to the frame may be employed. The screen for plate 112 is not disclosed; however, it is appreciated that it is assembled in a like manner. The screen 116 may be replaced by relatively rigid metal sheets 130, 132 disclosed in FIGURES 8 and 9. The metal sheets are affixed over the perforated plates 110, 112 and are secured in that position by a plurality of bolts 133 extending downwardly into peripheral frame 89. To allow communication of the inner plenum chambers 98 to the outside of the sector, the metal sheets 130, 132 are provided with a plurality of slits or slots 134 which present small openings leading into the plenum chambers 98. The relatively small size of the slits or slots prevents coal particles from penetrating through the sheet.

Referring again to FIGURES 4 and 6, the side portions of frame 89 are provided with radially extending semi-circular grooves 140 whereby adjacent sectors combine to form an elongated hole extending the radial length of the sector which hole is adapted to receive a tie rod 37 that coacts with an appropriate clamp, such as clamp 142, to secure the adjacent sectors directly onto shaft 10. To receive the clamp, the outermost portion of frame 89 is provided with a groove 144. The configuration of the groove 144 may have any of a variety of shapes as long as it matches the outer surface of clamp 142. (See FIGURE 5.) The sectors are thus assembled onto the shaft 10 so that each may be individually removed by taking away the clamp on either side of the sector.

In operation, each of the sectors 40–51 is assembled onto shaft 10 by means disclosed so that the base plenum chamber 90 and inner plenum chambers 98 are connected to passageways 74 within shaft 10. As the shaft 10 is driven by drive mechanism 18, passageway 74 of the various sectors is communicated selectively and in sequence with the vacuum source 26, the vacuum source 30 and the pressurized air source 34. By this arrangement, as a given sector is within the slurry 54, a predetermined vacuum is applied to inner plenum chambers 98 within the sector to draw small coal particles suspended within the slurry toward each surface of the sector. Screens 116 allow water to pass into the plenum chambers 98 from which it is expelled by appropriate means. The particles within the slurry cannot pass through the screen; therefore, they are accumulated on the screens. As the sector passes upwardly, as disclosed in FIGURE 2, out of the slurry 54, the sector is communicated through passageway 74 to a different vacuum source, i.e., vacuum source 30, which holds the particles against the screen and continues to extract water from the particles. As the disk 12 rotates toward the scraper 62, this water removal process is continuing so that the maximum amount of water is taken from the particles when the sector finally reaches the scraper 62. Since the particles are small and are acted upon by a substantially strong vacuum source, they form a rigid cake of coal which is paste-like in consistency and which does not tend to separate easily from the surface of screeen 116. For this reason, as the sector nears the scraper 62, inner plenum chambers 98 are communicated to pressurized air source 34 by passageways 74 to cause the cake or accumulated particles of wet coal to be separated from the sector screen. This allows the scraper 62 to scrape the coal particles into discharge chute 60.

Figure 10:
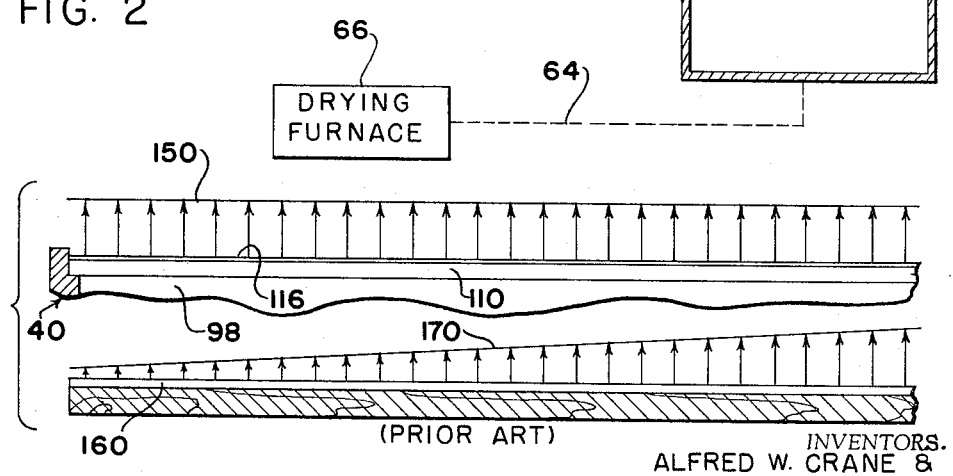
FIGURE 10 is a graphic view showing the vacuum gradients along the surface of the present invention and along the surface of the prior art.

As the coal particles are separated from the screen 116, approximately 75–80% of the water is withdrawn from the particles and the consumer may further dry the coal in a furnace before the coal is finally used. By constructing the separate sectors of disks 12 in accordance with the present invention, the inner plenum chambers 98 open toward each surface of the sector to provide the vacuum chamber for both surfaces without necessitating separate passageways adjacent each surface as was the case in the prior sector construction. The vacuum and water during operation passes radially inwardly through the large chambers 98 into the base plenum chamber 90 and then into the shaft 10 without encountering an appreciable amount of aerodynamic resistance as was presented by the prior wooden sectors. In essence, the flat surface of the wedge-shaped sector is provided with an underlying inner plenum chamber 98 which provides a high vacuum adjacent the complete surface area of the sector. The vacuum is then nearly the same near the bottom of the sector as it is near the top thereof. In the old sectors where small grooves were provided, the friction of the grooves caused the vacuum level to gradually decrease proportionally to the distance from the top of the sector. The relationship of the vacuum gradient along the surface of the old sector and a sector constructed in accordance with the present invention is shown in FIGURE 10 wherein it is noted that the gradient 150 of the proposed sector is substantially unchanged along the length of sector 40; however, a wooden sector having a plurality of small grooves 160 produces a vacuum gradient 170 which is substantially affected by the resistance of the grooves and which is decreased near the outermost end of the sector. This is only one benefit of a sector constructed in accordance with the present invention.

Various structural changes may be made in the preferred embodiment disclosed herein without departing from the scope and spirit of the present invention as defined by the appended claim.

Having thus described our invention, we claim:

In a vacuum filter comprised of a vacuum disk having a plurality of flat sectors with oppositely facing flat, filtering surfaces and adapted to rotate through a slurry of water and small suspended particles; each of said sectors comprising a wedge-shaped metal body and an integral mounting hub at the smaller end of said body, a first plenum chamber in said mounting hub, a plurality of radially extending ribs in said body and terminating at said first plenum chamber, said ribs forming a plurality of inner plenum chambers each of which are communicated with said first plenum chamber and with both of said filtering surfaces, and said hub having an inlet communicated with a source of vacuum; the improvement comprising; said hub having a generally relatively large area flat surface facing in the same direction as one of said filtering surfaces, an opening in said flat surface of said hub, said opening communicated directly with said first plenum chamber, a removable cover secured over said opening, and means on said cover for aligning said cover with said opening.

References Cited by the Examiner

UNITED STATES PATENTS

| | | | |
|---|---|---|---|
| 1,685,085 | 9/1928 | Hoyt | 210—486 X |
| 1,746,409 | 2/1930 | Sweetland et al. | 210—331 |
| 2,395,225 | 2/1946 | Kurz | 210—486 |
| 2,781,133 | 2/1957 | Thompson | 210—395 |
| 3,019,905 | 2/1962 | Baker et al. | 210—486 |

REUBEN FRIEDMAN, *Primary Examiner.*

F. A. SPEAR, *Assistant Examiner.*